United States Patent [19]

Madden

[11] Patent Number: 4,901,692
[45] Date of Patent: Feb. 20, 1990

[54] ENGINE AND LOW VIBRATION CRANKSHAFT THEREFOR

[75] Inventor: Dermot G. Madden, Farmington Hills, Mich.

[73] Assignee: Saturn Corporation, Troy, Mich.

[21] Appl. No.: 281,586

[22] Filed: Dec. 9, 1988

[51] Int. Cl.$^4$ .............................................. F02B 75/06
[52] U.S. Cl. ................................... 123/192 B; 74/603
[58] Field of Search ........ 123/192 R, 192 B, 197 AC; 74/595, 596, 602, 603

[56] References Cited

U.S. PATENT DOCUMENTS

| | | | |
|---|---|---|---|
| Re. 16,024 | 3/1925 | Oldson | 74/603 |
| 2,095,970 | 10/1937 | Dashefsky | 74/604 |
| 2,103,185 | 12/1937 | Rumpler | 74/596 |
| 4,699,098 | 10/1987 | Hoshiba et al. | 123/192 B |

Primary Examiner—Noah P. Kamen
Attorney, Agent, or Firm—Robert J. Outland

[57] ABSTRACT

A low vibration crankshaft has crankarms of decreasing inertia/mass and stiffness as their distance torsional vibration node of the rotating vibration system increases. The mass and stiffness of the crankarms may be varied by changing the lateral width of the arms or by other means. The arrangement provides, in combination with an engine or other reciprocating piston machine, an increased or maximized torsional vibration resonant frequency and resulting lower or minimized angular deflections of the crankshaft in the condition of system resonance.

6 Claims, 3 Drawing Sheets

ENGINE AND LOW VIBRATION CRANKSHAFT THEREFOR

TECHNICAL FIELD

This invention relates to reciprocating piston machines, such as internal combustion engines, and to crankshafts for such machines, engines and the like. In a preferred embodiment, the invention relates to multiple throw crankshafts for engines and in combination therewith.

BACKGROUND

In U.S. Pat. No. 2,103,185 Rumpler, issued Dec. 21, 1937, it is proposed to form a hollow engine crankshaft with progressively increasing wall thickness toward the output end in order to accommodate the accumulative gas forces transmitted by the journals, crankpins and crankarms as the output end is approached.

While such a crankshaft design may be appropriate for some engine configurations, the patent's teachings apparently fail to consider that a crankshaft has finite stiffness and will have resonant frequencies excited by the firing loads and/or the engine speed. The absence of concern for torsional vibration in Rumpler's patent is a reflection of the typically lower maximum speed of engines in 1937. The loads caused by torsional vibration of todays high speed engines, commonly operating in the neighborhood of 7-8,000 RPM, must be accounted for in the design in addition to the gas forces.

SUMMARY OF THE INVENTION

The present invention provides an improved crankshaft construction which, in combination with its connected components, approaches, more closely than conventional designs, a maximum torsional frequency with minimum vibration amplitudes and torsional stress under its design operating conditions.

To provide a finished crankshaft design according to the invention requires analysis of the crankshaft system in accordance with known methods of vibration analysis. This analysis is based on the torsional stiffness and inertia characteristics of the entire crankshaft. This information is used in combination with the operating load data (i.e., engine RPM and cylinder pressure data) to determine the vibratory response of the system. The critical pieces of information determined in this analysis are the resonant frequencies, amplitudes of vibration, and the torsional stresses.

The torsional stiffness and mass/inertia of the crankarms are varied above the minimum values required for delivering the maximum driving torques applied to the crankarms during operation. The intent is to provide a maximum stiffness near the nodal point of the first resonant mode of the crankshaft system (the nodal point is the position of zero torsional deflection) and then reduce the stiffness and inertia/mass of the other crankarms in relation to their distance from the nodal point. In this manner, inertia torques are minimized and therefore vibration amplitudes and stresses are minimized while increasing the resonant frequencies as compared to conventional designs in which the crankarms all have equal torsional stiffness and inertia/mass.

In a practical application of the invention, it may be desirable, for design and manufacturing simplification, to approximate the ideal design by limiting the differences in the crankarms. Thus, it is possible, for example, to make of equal size and torsional strength, pairs of crankarms on either side of each main journal, or both crankarms of each crankthrow, while varying the torsional strengths of the pairs of crankarms generally in proportion to their distances from the vibration node, or nodal point.

These and other features, modifications and advantages of the invention will be more fully understood from the following description of a preferred embodiment, taken together with the accompanying drawings.

BRIEF DRAWING DESCRIPTION

In the drawings:

FIG. 1 is a cross-sectional view of an internal combustion engine having a low resonance crankshaft formed in accordance with the invention;

FIG. 2 is a side view of the crankshaft having superimposed thereon a mode shape diagram of the crankshaft torsional vibration amplitudes as connected in the engine assembly and operated at a maximum torsional vibration operating condition; and FIGS. 3-10 are transverse cross-sectional views through the crankshaft at the locations indicated by the lines 3—3 to 10—10 respectively of FIG. 2 and showing the configurations of the various crankarms.

DETAILED DESCRIPTION

Figure 1:
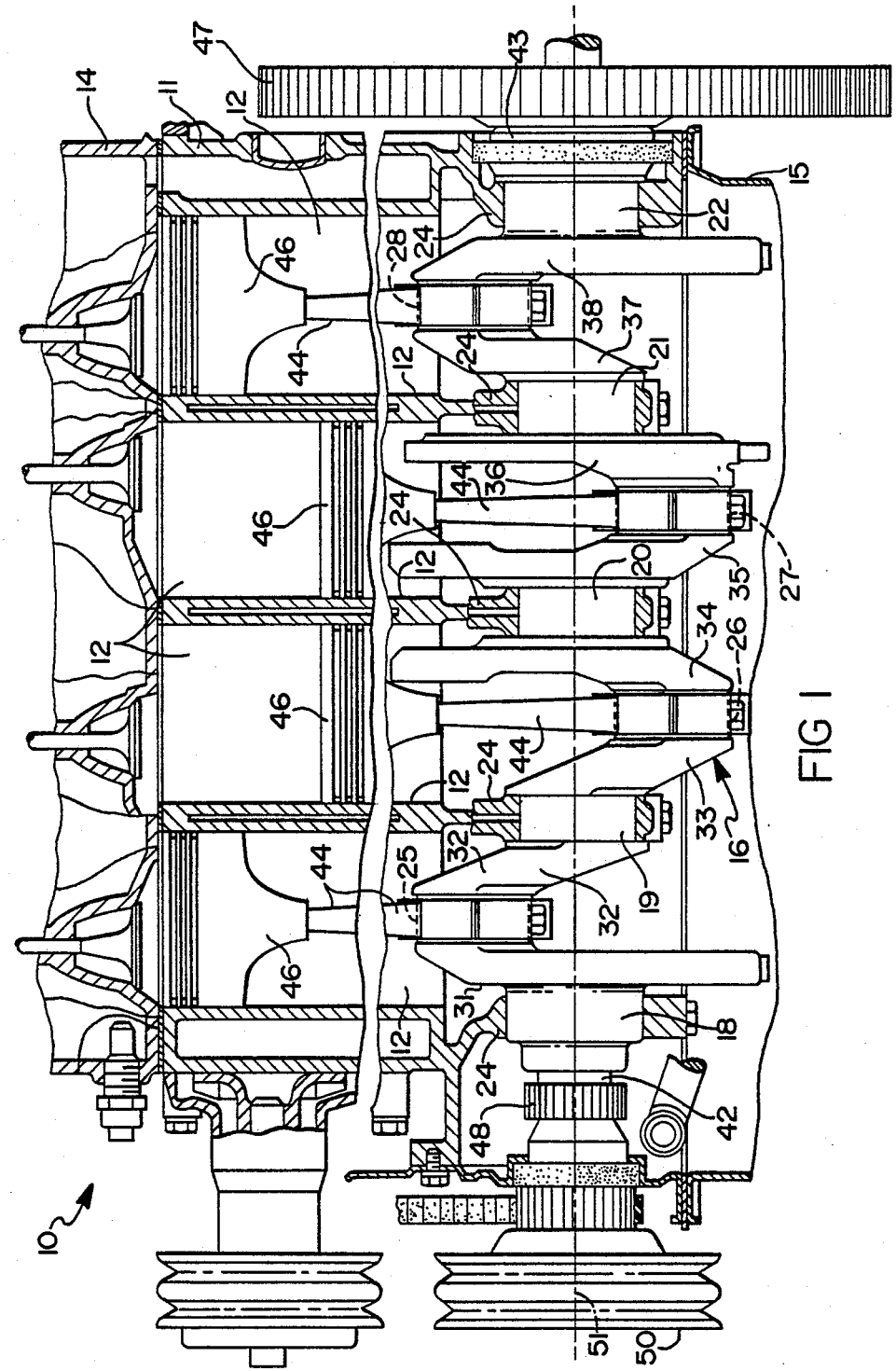

Referring now to the drawings in detail, numeral 10 generally indicates a four-stroke cycle four cylinder automotive-type internal combustion engine intended for use in automobiles or the like. Engine 10 includes the usual engine cylinder block 11 having a plurality of cylinders 12 aligned in a single bank and closed at their ends by a cylinder head 14. The block 11 also defines a crankcase having an open bottom that is conventionally closed by an oil pan 15.

Rotatably carried in the crankcase portion of the engine block 11 is a crankshaft 16 formed in accordance with the invention. The crankshaft includes five main journals 18-22 supported in axially spaced and aligned main bearing webs 24 of the engine block. Between the adjacent pairs of journals are radially offset crankpins 25-28, each supported by a pair of crankarms. From front to rear the crankarms are indicated by numerals 31-38. In addition, the crankshaft includes a front end stub 42 and a rear end flange 43.

As is conventional, the crankpins 25-28 connect through connecting rods 44 with pistons 46 reciprocably movable in the cylinders 12. In assembly in the engine, a flywheel 47 is attached to the flange 43 at the rear of the crankshaft for connection with a clutch, the torque converter of an automatic transmission or other associated output means. At the front end, an oil pump drive gear 48 and a camshaft and accessory drive 50 are mounted on the stub 42.

In order to minimize the torsional vibration stress and deflection that occur in the crankshaft during engine operation, the invention provides for the selective sizing of the individual crankarms to obtain the minimum mass and optimum stiffness needed to withstand the combination of torsional vibration and other forces that occur at their respective locations. The design process first requires selection of the major crankshaft characteristics, including main and crankpin dimensions and spacing and the selection of nominal crankarm dimensions to provide a first approximation of a crankshaft design adequate to withstand the calculated driving torque pulses.

There follows a torsional vibration analysis of the crankshaft as assembled with its associated pistons, accessory drive, flywheel and other components that are to be fixedly attached to or driven by the crankshaft. The analysis determines the vibration node or zero point of angular deflection in the system in the torsional vibration mode or modes of interest in the engine operating speed range. The angular deflection is then reduced by substantially stiffening the crankarms near the node while increasing less, or even reducing, the stiffness (and mass) of the other crankarms in approximate proportion to their distances from the node.

This requires an iterative process of adjusting the stiffness and inertia/mass of the crankarms and then recalculating the torsional vibration characteristics until an overall maximum torsional natural frequency, giving a minimum angular deflection of the crankshaft, is reached, or is approached to a degree considered satisfactory to the crankshaft designer. This process requires recognition that, as the axial distance from the node increases, the crankarms will generate increasing inertia torques. Therefor, it is desirable to make the crankarms near the node as stiff as possible to minimize the angular deflection which occurs there.

On the other hand, substantial reductions in the inertia/mass of the crankarms at the greatest distances from the node, or nodal point, will result in the most significant reductions in the maximum angular deflection. This effect may more than offset the resulting reductions in stiffness of the distal crankarms, although, of necessity, they must remain sufficiently stiff to accept the maximum torque loadings imposed on them by the pistons in the normal operation of the engine.

Figure 2:
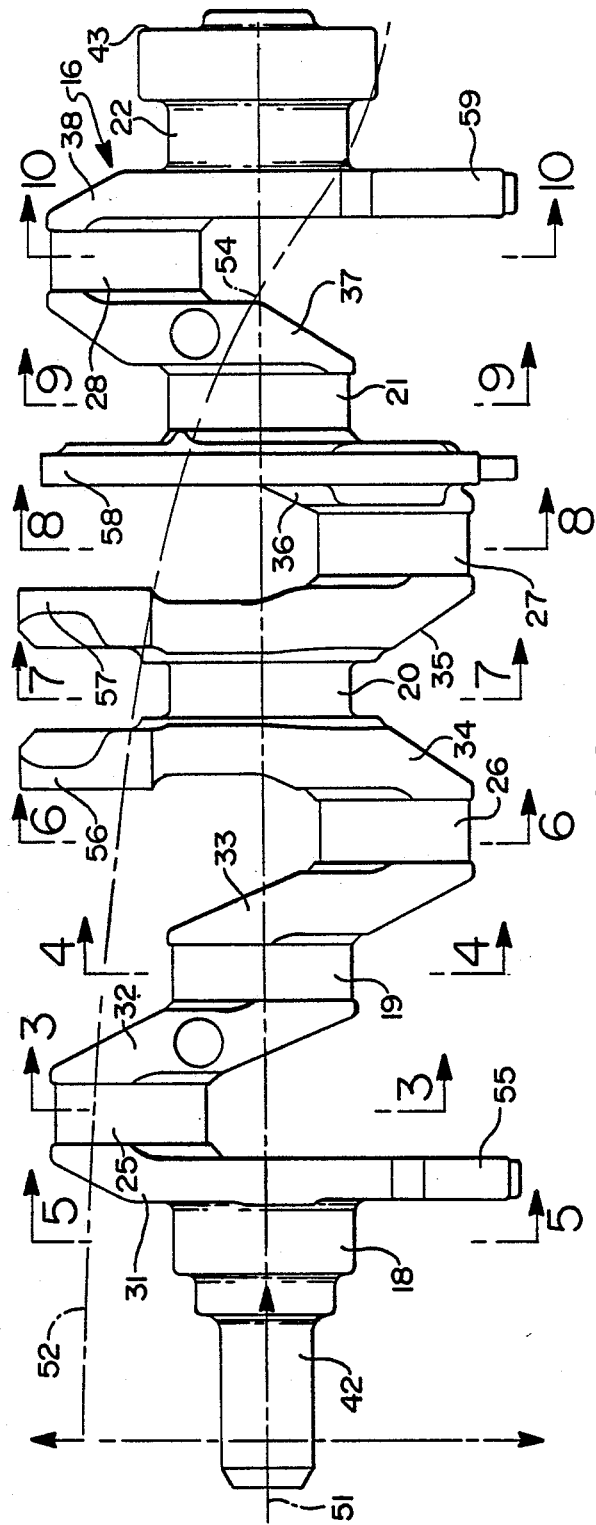

The results of applying the described method to the crankshaft 16 described herein are seen in the side view and mode shape diagram of FIG. 2 and the cross-sectional views of FIGS. 3–10, in which the background throws have been omitted for clarity. In FIG. 2, the mode shape diagram indicates, by the distance from the crankshaft axis 51 of a dashed line 52, the relative angular deflection, in degrees double amplitude (DDA), of the adjacent crankshaft portions (in the same normal plane) at the resonant operating speed. The node 54, or nodal point, is where the line 52 crosses the axis 51, indicating that the angular deflection is zero at that point.

Figure 4:
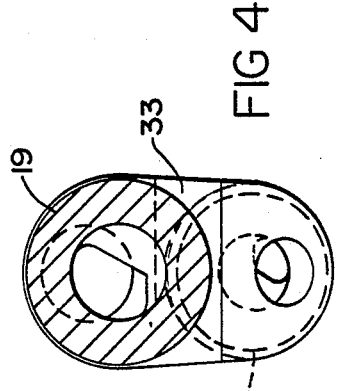
Figure 3:
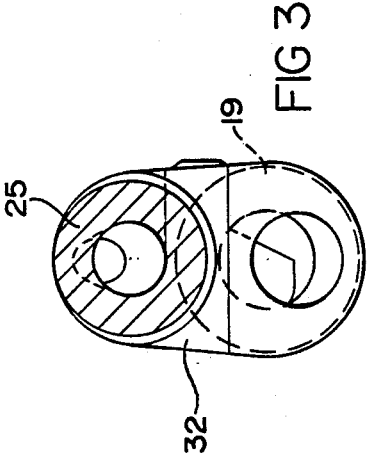
Figure 5:
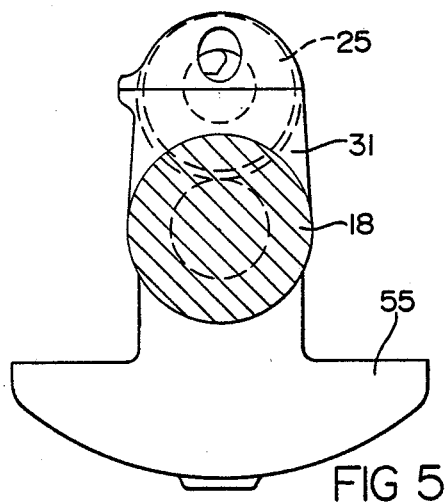

In the crankshaft development, design and manufacturing simplicity were served by utilizing identical crankarm configurations for the pairs of crankarms on either side of the interior main journals 19–21. Thus, FIGS. 3 and 4, showing the configurations of crankarms 32 and 33, respectively, on opposite sides of main journal 19, indicate identical crankarm shapes of relatively narrow width (i.e. laterally in a plane normal to the axis 51), giving relatively low inertia/mass (and stiffness in view of their location at a relatively great distance from the node 54. FIG. 5 shows the front crankarm 31, at the furthest distance from the node 54, also has the narrowest width and the lowest inertia/mass and stiffness of all the crankarms. At this location, a crankshaft counterweight 55 is also located, extending oppositely from the crankarm 31.

Figure 6:
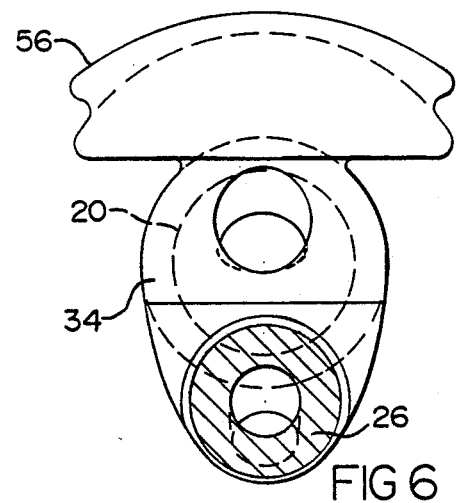
Figure 7:
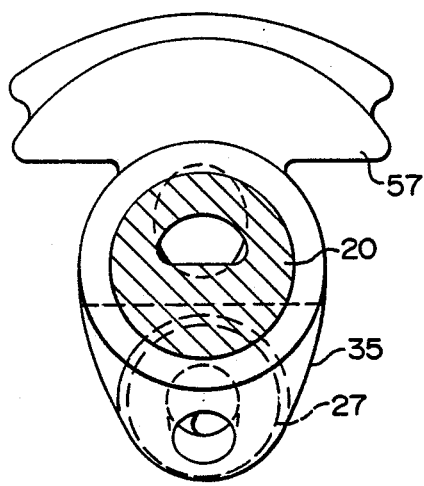

FIGS. 6 and 7 illustrate the crankarms 34, 35 and associated counterweights 56, 57 disposed on opposite sides of the center main journal 20. The crankarms of this pair are of substantially greater width, mass and stiffness in view of their closer location to the node 54 than narrow crankarms 32, 33.

Figure 8:
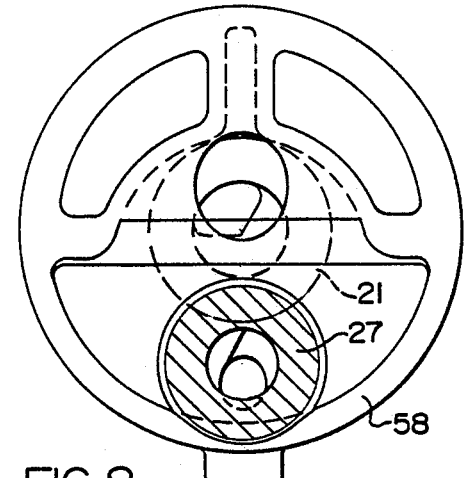
Figure 9:
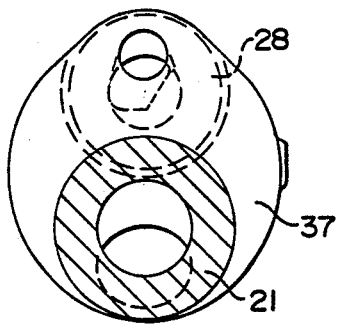

FIGS. 8 and 9 illustrate the pair of crankarms 36, 37 disposed on either side of main journal 21. Both of these crankarms are of near maximum stiffness as indicated by their greater width, since their locations are at or near the node 54. However, the shape of crankarm 36 differs further since it also incorporates a reluctor ring 58 for use as a timing wheel during engine operation. In view of the extra mass added to the crankshaft by this ring, it is desirably located at a point as near to the node as practical, hence the incorporation into crankarm 36. It should be apparent that crankarm 37 would be an even better location, if permitted by other features of the engine.

Figure 10:
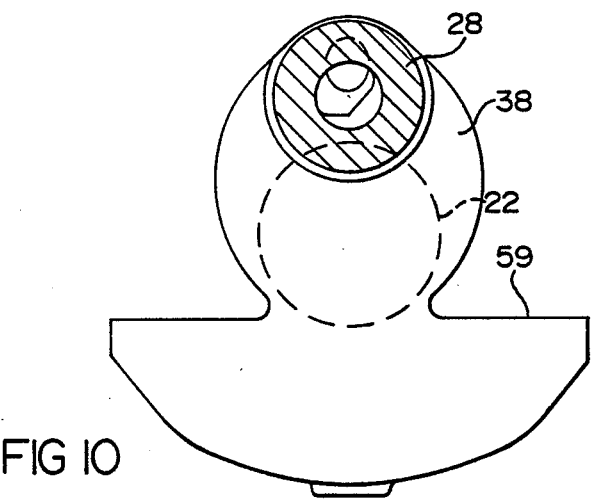

FIG. 10 shows the configuration of the rear end crankarm 38 together with the associated rear counterweight 59. By virtue of its position very near to the node 54, crankarm 38 is of a relatively great width, mass and stiffness similar to that of the crankarm 36.

In the crankshaft embodiment shown, it is apparent that the masses and stiffnesses of the various crankarms have been varied primarily by varying their lateral widths. However, it should be understood that other forms of construction, such as variations in longitudinal thickness or hollowed portions, could be utilized for varying the masses and stiffnesses of the crankarms without departing from the scope of the invention.

Thus, while the invention has been described by reference to one illustrated embodiment, it should be understood that numerous changes could be made within the spirit and scope of the inventive concepts described. Accordingly it is intended that the invention not be limited to the illustrated embodiment, but that it have the full scope permitted by the language of the following claims.

The embodiments of the invention in which an exclusive property or privilege is claimed are defined as follows:

1. In combination in a reciprocating piston machine, a frame having a plurality of cylinders and supporting a crankshaft having a plurality of main journals carried in the frame and spaced along an axis, a plurality of crankpins radially offset from the axis and axially spaced intermediate the main journals and a plurality of crankarms interconnecting the crankpins with adjacent ones of the journals, connecting rods connecting the crankpins with associated pistons acting within the cylinders, and a rotatable mass connected with the crankshaft at one end, the crankshaft having, when rotated in assembly with said other associated components within a prescribed rotational speed range, a peak torsional vibration resonance of a determinable vibration mode and order occurring at a rotational speed within the speed range at which vibrational angular deflection of the crankpins and crankarms relative to a reference at least one zero node reaches a maximum that increases with the distance from the nearest of such nodes, wherein the masses and stiffnesses of the various crankarms are, in general, reduced as their distance from the nearest node is increased, in a degree to approach a minimum vibrating crankshaft mass and limit the maximum angular deflection of the crankpins at said rotational speed.

2. In combination in an internal combustion engine, a frame having a plurality of cylinders and supporting a crankshaft having a plurality of main journals carried in the frame and spaced along an axis, a plurality of crankpins radially offset from the axis and axially spaced intermediate the main journals and a plurality of crankarms interconnecting the crankpins with adjacent ones of the journals, connecting rods connecting the crankpins with associated pistons acting within the cylinders and subject to varying gas loads, and a rotatable mass connected with the crankshaft at one end, the crankshaft having, when rotated in assembly with said other associated components within a prescribed rotational speed range, a peak torsional vibration resonance of a determinable vibration mode and order occurring at a rotational speed within the speed range at which vibrational angular deflection of the crankpins and crankarms relative to a reference at least one zero node reaches a maximum that increases with the distance from the nearest of such nodes, wherein the masses and stiffnesses of the various crankarms are, in general, reduced as their distance from the nearest node is increased, in a degree to approach a minimum vibrating crankshaft mass and limit the maximum angular deflection of the crankpins at said rotational speed.

3. A crankshaft having a plurality of main journals spaced along an axis, a plurality of crankpins radially offset from the axis and axially spaced intermediate the main journals and a plurality of crankarms interconnecting the crankpins with adjacent ones of the journals, the crankshaft having, in assembly with other associated components with which it is intended to rotate about the axis within a prescribed rotational speed range, a peak torsional vibration resonance of a determinable vibration mode and order occurring at a rotational speed within the speed range at which vibrational angular deflection of the crankpins and crankarms relative to a reference at least one zero node reaches a maximum that increases with the distance from the nearest of such nodes, wherein the inertia/masses and stiffnesses of the various crankarms are, in general, reduced as their distance from the nearest node is increased, in a degree to approach a minimum vibrating crankshaft mass and limit the maximum angular deflection of the crankpins at said rotational speed.

4. A crankshaft as in claim 3 wherein the variations in inertia/mass and stiffness of the various crankarms are due, at least partially, to variations in the lateral widths of the crankarms.

5. A crankshaft having a plurality of main journals spaced along an axis, a plurality of crankpins radially offset from the axis and axially spaced intermediate the main journals and a plurality of crankarms interconnecting the crankpins with adjacent ones of the journals, the stiffnesses of various crankarms differing in a predetermined pattern due to variations in the lateral widths of the crankarms.

6. A crankshaft having a plurality of main journals spaced along an axis, a plurality of crankpins radially offset from the axis and axially spaced intermediate the main journals and a plurality of crankarms interconnecting the crankpins with adjacent ones or the journals, certain of the crankarms differing in lateral width from one another to vary their torsional stiffness and inertia/mass.

* * * * *